United States Patent

Pfeiler et al.

Patent Number: 5,084,619
Date of Patent: Jan. 28, 1992

[54] X-RAY DIAGNOSTICS INSTALLATION HAVING A SOLID-STATE TRANSDUCER

[75] Inventors: Manfred Pfeiler, Erlangen; Fritz-Walter Hofmann, Buckenhof; Wolfgang Knuepfer, Erlangen, all of Fed. Rep. of Germany

[73] Assignee: Siemens Aktiengesellschaft, Munich, Fed. Rep. of Germany

[21] Appl. No.: 742,202

[22] Filed: Jul. 31, 1991

Related U.S. Application Data

[63] Continuation-in-part of Ser. No. 611,981, Nov. 13, 1990, abandoned.

[30] Foreign Application Priority Data

Jan. 12, 1990 [EP] European Pat. Off. ......... 90100647.8

[51] Int. Cl.$^5$ ............................................. G03B 42/02
[52] U.S. Cl. .............................. 250/327.2; 250/484.1
[58] Field of Search .......... 250/327.2, 484.1, 327.2 R, 250/484.1 R

[56] References Cited

U.S. PATENT DOCUMENTS

| | | | |
|---|---|---|---|
| Re. 31,847 | 3/1985 | Luckey | 250/327.2 |
| 3,710,127 | 1/1973 | Kohashi et al. | 250/213 R |
| 4,628,356 | 12/1986 | Spillman et al. | 358/111 |
| 4,873,708 | 10/1989 | Cusano et al. | 378/62 |
| 4,922,103 | 5/1990 | Kawajiri et al. | 250/327.2 |
| 4,945,423 | 7/1990 | Takanashi et al. | 358/300 |

FOREIGN PATENT DOCUMENTS 60-149042 8/1985 Japan ................. 250/327.2

OTHER PUBLICATIONS

"Application of Solid State Image Converters (SSIC) in Criminal Investigation", Sturmer, SPIE, vol. 108, Optics in Security and Law Enforcement (1977, p. 21).

Primary Examiner—Constantine Hannaher
Attorney, Agent, or Firm—Hill, Van Santen, Steadman & Simpson

[57] ABSTRACT

An x-ray diagnostics installation has a solid-state image transducer with a layer whose electrical resistance is dependent on the intensity of incident radiation from an x-ray source, and an electro-luminescent layer in contact therewith which converts the resistance into a corresponding brightness value. Due to the decay time of the electro-luminescent layer, an image will be temporarily stored in the solid-state image transducer after the x-ray source has been deactivated. This temporarily stored image is read-out, after deactivation of the x-ray source, by a scanner for converting the brightness of the picture elements of the electro-luminescent layer into corresponding electrical signals. These signals are supplied to a data acquisition and processing system, which generates an image for display.

7 Claims, 2 Drawing Sheets

X-RAY DIAGNOSTICS INSTALLATION HAVING A SOLID-STATE TRANSDUCER

This is a continuation-in-part of application Ser. No. 611,981, filed Nov. 13, 1990, now abandoned.

BACKGROUND OF THE INVENTION

1. Field of the Invention

The present invention is directed to an x-ray diagnostics installation for producing radiological images, and in particular to such an installation having a solid-state image transducer.

2. Description of the Prior Art

A solid-state image transducer for producing a radiological image is described in the article "Application of Solid-State Image Converters (SSIC) in Criminal Investigation," Stuermer, SPIE Vol. 108, Optics in Security and Law Enforcement (1977), p. 21, having a layer whose electrical resistance is dependent on the intensity of the incident radiation, and an electro-luminescent layer in contact therewith which converts the resistance into a corresponding brightness value. A high-frequency alternating voltage is supplied via transparent electrodes disposed adjacent those sides of the two layers facing away from each other. The image generated is intended to be directly visible and is for the purpose of avoiding the need for making a large number of radiographs of suspect objects in security systems, such as airport baggage inspection systems.

A solid-state image transducer of this type has not been suitable for use heretofore in medical radiology, because the electro-luminescent layer has a relatively high lag, thereby making the transducer unsuitable for the observation of moving images.

SUMMARY OF THE INVENTION

It is an object of the present invention to provide an x-ray diagnostics installation for medical radiology which uses a solid-state image transducer as a storage element, rather than as a means for direct observation of an image, with the stored image from the solid-state image transducer being digitized and processed for visual display.

The above object is achieved in accordance with the principles of the present invention in an x-ray diagnostics installation having a solid-state image transducer of the type described above, with a scanning means for generating electrical signals corresponding to the brightness of the picture elements of the electro-luminescent layer, the electrical signals being supplied to a data acquisition and processing system which constructs a visual image for display. Due to the decay time of the electro-luminescent layer, an image is temporarily stored in that layer after deactivation of the x-ray source. This image is read-out, after deactivation of the x-ray source, using the scanning means. The scanning means includes a light detector, which generates an electrical output signal corresponding to the brightness of the individual picture elements of the temporarily stored image. The image on the display can be generated at any time, and is thus not dependent on the chronological inertia properties of the solid-state image transducer.

DESCRIPTION OF THE PREFERRED EMBODIMENTS

Figure 1:
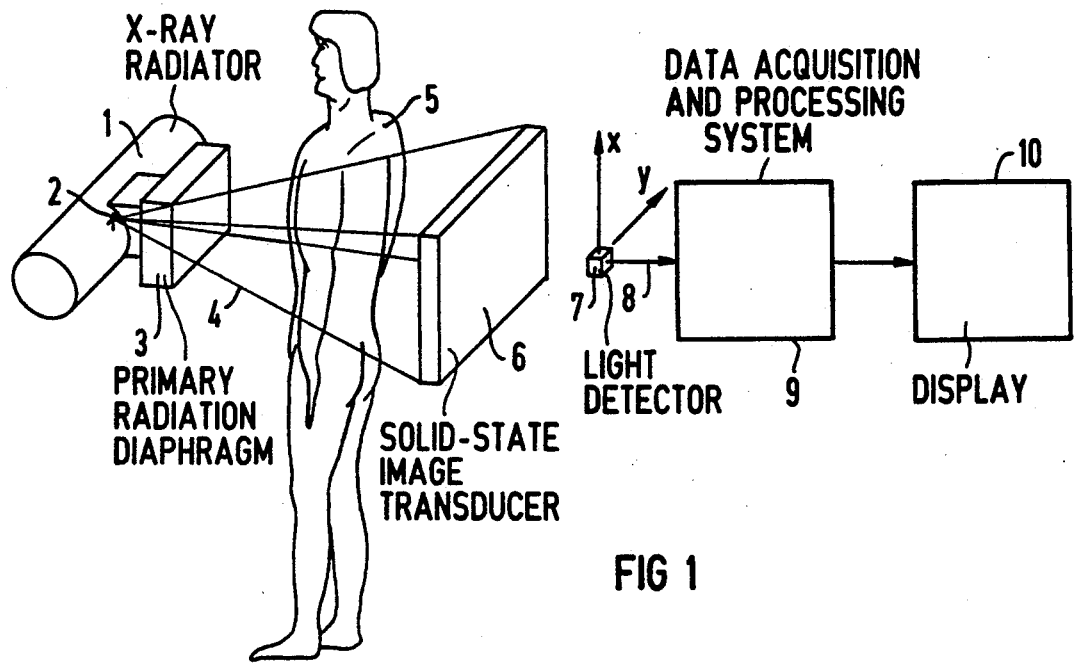
FIG. 1 is a schematic block diagram of an x-ray diagnostics installation constructed in accordance with the principles of the present invention, in a first embodiment.

In the first embodiment of the x-ray diagnostics installation shown in FIG. 1, the installation includes an activatable x-ray radiator 1 which generates a pyramid-shaped x-ray beam 4 emanating from a focus 2 of the x-ray radiator 1. The beam 4 is gated by a primary radiation diaphragm 3. The gated x-ray beam penetrates a patient 5, and is incident on a solid-state image transducer 6. The solid-state image transducer 6 stores the image over several seconds, through several minutes. The transducer 6 is electrically excited to luminesce, so that the stored image is not erased. As shown in FIG. 1, when the solid-state image transducer 6 is caused to luminesce, it is scanned by a light detector 7 which is moved in a meandering path in the x-direction and y-direction, as schematically indicated. The brightness values of the picture elements of the solid-state image transducer 6 are converted by the light detector 7 into electrical signals, which are supplied via a line 8 to a data acquisition and processing system 9. The signals are converted into digital form and are processed in a known manner to generate an image of the region of the subject 5 exposed to x-rays, the image being visually reproduced on a display 10.

Figure 2:
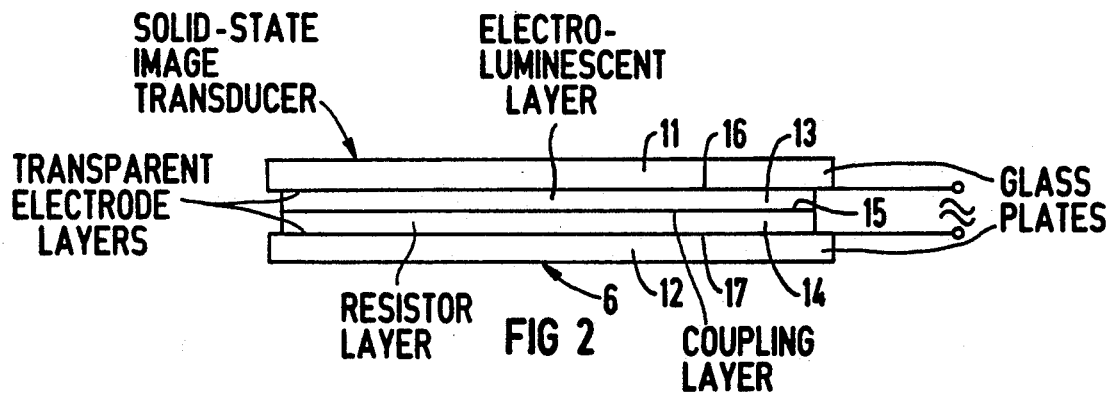
FIG. 2 is a side view of a solid-state image transducer suitable for use in an x-ray diagnostics installation in any of the embodiments.

As shown in FIG. 2, the solid-state image transducer 6 consists of an electro-luminescent layer 13 and a resistor layer 14 in contact therewith, sandwiched between two glass plates 11 and 12. A coupling layer 15 is disposed between the layers 13 and 14, and a transparent electrode layer 16 is disposed between the glass plate 11 and the electro-luminescent layer 13 and a further transparent electrode layer 17 is disposed between the glass plate 12 and the resistor layer 14.

High frequency electrical voltage is supplied to the electrode layers 16 and 17. This causes a current flow through the electro-luminescent layer 13, the amplitude of which is dependent on the resistance of the resistor layer 14. The resistance of the resistor layer 14 is defined by the intensity of the incident x-rays. Therefore, the brightness of the individual picture elements of the electro-luminescent layer 13 is set dependent on the resistance of the resistor layer 14, and thus on the intensity of the incident x-rays. Accordingly, the electro-luminescent layer 13 reproduces an x-ray shadowgraph of the irradiated region of the patient 5.

The electro-luminescent layer 13 has a relatively long decay time, which may amount to several seconds through several minutes, which makes it possible to temporarily store an individual image over this time even though x-rays are no longer incident on the transducer 6. The stored individual image is non-destructively read-out pixel-by-pixel using the components shown in FIG. 1 after the x-ray radiator 1 has been deactivated. This read-out can be multiply repeated during the decay time. This can be of interest given low image doses which result in low luminances, because the influence of the intrinsic noise of the light detector 7 and the subsequent electronics can be largely reduced by multiple read-outs. If the read-out signals are summed, preferably in digital form, in their proper topical allocation, a substantially noise-free x-ray image is obtained, with the only remaining noise being the result of unavoidable quantum noise.

As shown in FIG. 1, the read-out can ensue point-by-point. It is also possible to employ a linear light detector consisting of a row of detector elements, so that a line-by-line read-out is achieved. It is also possible to undertake a two-dimensional read-out using a planar light detector screen, wherein a relative motion with respect to the solid-state image transducer 6 is not required.

The solid-state image transducer may be flat or curved.

In the example of FIG. 1, the brightness of one picture element of the solid-state image transducer 6 is acquired at a time by the light detector 7. As described above, the light detector 7 can be moved in the x-direction and the y-direction, but may also be moved only in one of these directions, if the solid-state image transducer 6 is moved in the other direction. The precise acquisition of the brightness of an individual picture element is possible if column diaphragms are moved in the x-direction and y-direction relative to each other and relative to the components 6 and 7, so that the light detector 7 always "sees" only one picture element.

Figure 3:
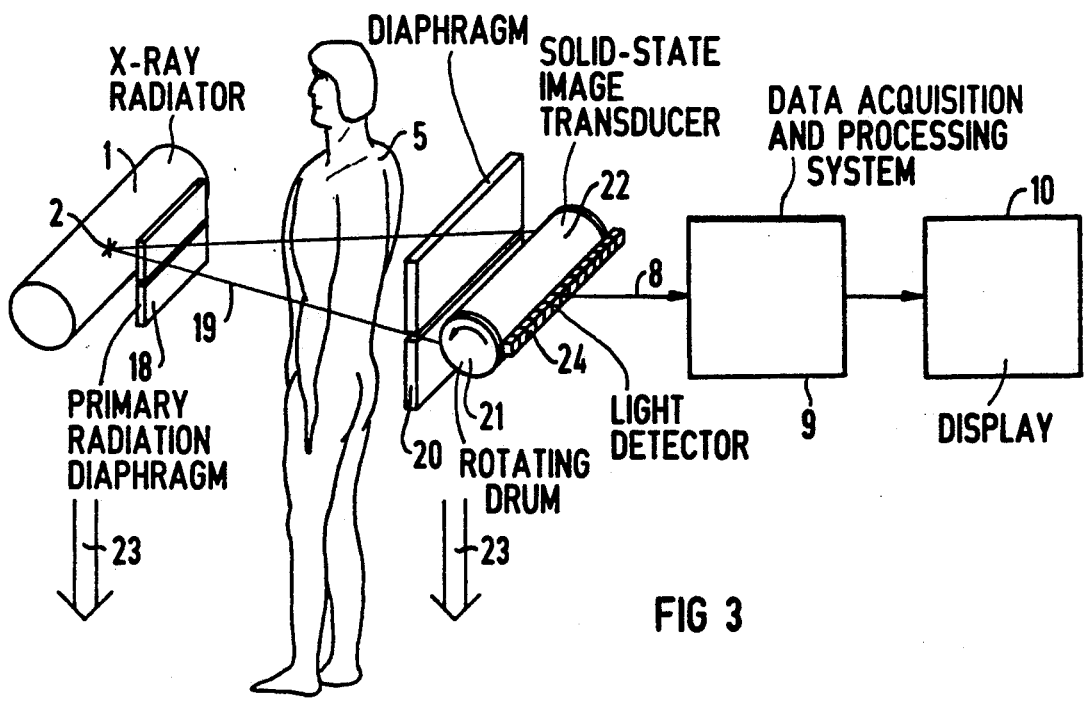
FIG. 3 is a schematic block diagram of an x-ray diagnostics installation constructed in accordance with the principles of the present invention, in a second embodiment.

In FIG. 3, a slotted primary radiation diaphragm 18 is used, which causes a fan-shaped x-ray beam 19 to be generated. A second slotted diaphragm 20 is provided following the patient 5 in the direction of radiation propagation. After passing through the patient 5, the x-ray beam 19 is incident on a solid-state image transducer 22, arranged on a rotating drum 21. The image transducer 22 is constructed as shown in FIG. 2. The electrical voltage for causing the transducer 22 to luminesce is supplied to the transducer 22 via rotating current couplings, such as brushes or wipers, which are not shown in detail.

For registering an image, the x-ray radiator 1 together with the primary radiation diaphragm 18, the drum 21 with the solid-state image transducer 22, and the slotted diaphragm 20 are moved in the direction of the arrow 23. The drum 21 is rotated. The image of the irradiated region of the patient 5 is registered line-by-line on the solid-state image transducer 22 in this manner. Stray radiation is thereby suppressed.

For reading out the image registered on the solid-state image transducer 22, after deactivation of the x-ray radiator 1 the transducer 22 is rotated past a linear light detector 24 consisting of a row of detector elements. The output signals of the detector elements are again supplied to the data acquisition and processing system 9, from which an image is obtained.

Figure 4:
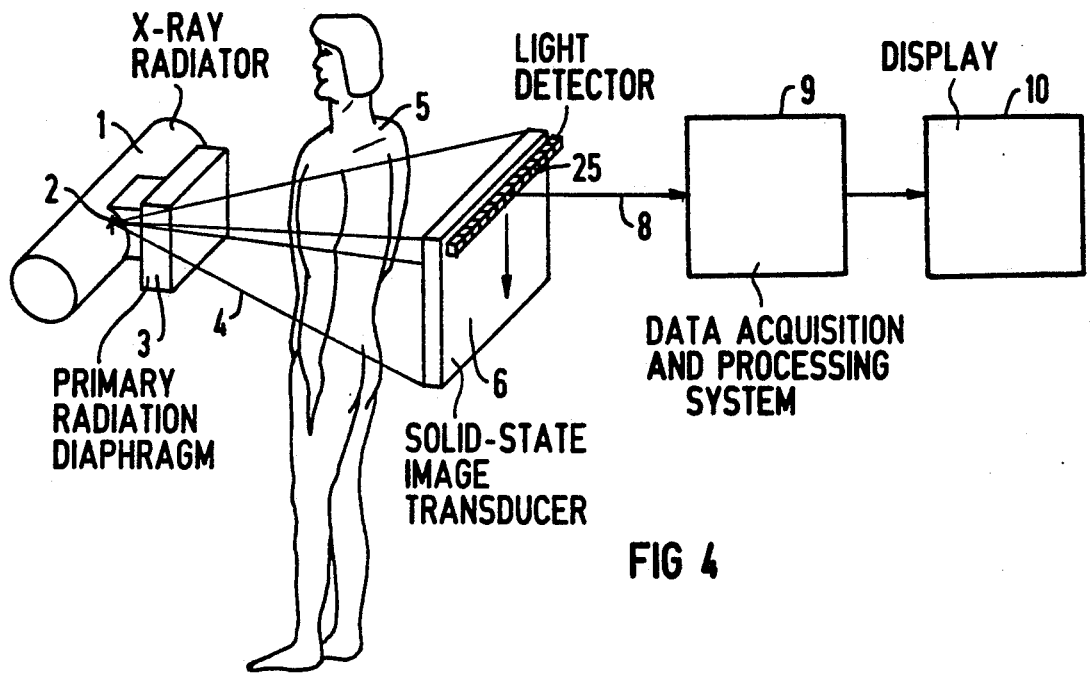
FIG. 4 is a schematic block diagram of an x-ray diagnostics installation constructed in accordance with the principles of the present invention, in a third embodiment.

A further embodiment is shown in FIG. 4, wherein the components 1 through 6 correspond to the previously-described components of FIG. 1. In the embodiment of FIG. 4, the image of the solid-state image transducer 6 is read out by a linear light detector 25 consisting of a row of detector elements which, for the purpose of line-by-line scanning, is conducted past the solid-state image transducer 6 in a direction perpendicular to the line direction during the read-out scan.

In either of the above embodiments, for undertaking a read-out the solid-state image transducer 6, or the drum 21 with the solid-state image transducer 22 thereon, can be moved from an image registration position to a scanning position, if desired.

If a planar (two-dimensional) light detector screen is used, a relative motion between the light detector and the solid-state image transducer is no longer required. The detector elements of such a planar detector may have such a small area that a demagnification of the image of the solid-state image transducer is required. The optical coupling of the individual detector elements can be undertaken with fiber optics.

After reading the radiologically generated image from the solid-state image transducer 6 or 22, the image is not automatically erased. Quenching can be undertaken using a correspondingly polarized, continuous electrical field applied via the electrodes 16 and 17 in FIG. 2.

The repetition time between successive registrations may, for example, be between 10 and 20 seconds. If multiple optical read outs are undertaken, these should preferably be concluded during this time span, and the necessary post-processing of the signals generated as a result thereof should then ensue.

An x-ray diagnostics installation of the type described herein, having an optically scanned solid-state image transducer for producing a digital x-ray image, is an alternative to the use of known systems using stimulable phosphors of a different type. These known types of systems require more structural volume for temporary image storing wherein read-out ensues by scanning the stimulable phosphor layer with laser light. The installation disclosed herein is also an alternative to known installations using a charge-storing layer, for example consisting of selenium, wherein a charge distribution corresponding to the x-ray image is scanned.

By contrast to the polycrystalline nature of the phosphors used in all foil systems, such as stimulable phosphor foils, the electro-luminescent layer 13 of the installation disclosed herein can be applied grain-free, i.e., amorphously. The image resolution is thereby improved in comparison to such conventional foils.

In addition to scanning the image of the solid-state image transducer 6 or 22, a contact registration by direct exposure may also be undertaken.

If the repetition time between successive image registrations is increased to approximately 1 Hz, a digitally pulsed fluoroscopic image can be achieved using the x-ray diagnostics installation disclosed herein.

Materials for the electro-luminescent layer 13 and the resistor layer 14 are known. For example, the electro-luminescent layer may consist of ZnS, and the resistor layer 14 may consist of CdS.

Materials such as CdSe, $HgI_2$ and $PbO_2$, which have a higher x-ray absorption in comparison to CdS, may alternatively be used as further materials for the resistor layer 14. Use of such materials permits a lower layer thickness, and also results in an improvement in the topical sharpness.

In contrast to polycrystalline resistor layers, a layer consisting of $HgI_2$ can be applied, for example, using a dynamic sublimation technique as described by Hassan et al. in the *Journal of Crystal Growth*, Vol. 44 (1978), pp. 473-474, and $PbO_2$ can be applied by vapor-deposition, as described by Du Chatenier et al. in *Philips Res. Repts.* 24 (1969), pp. 392–406.

Figure 5:
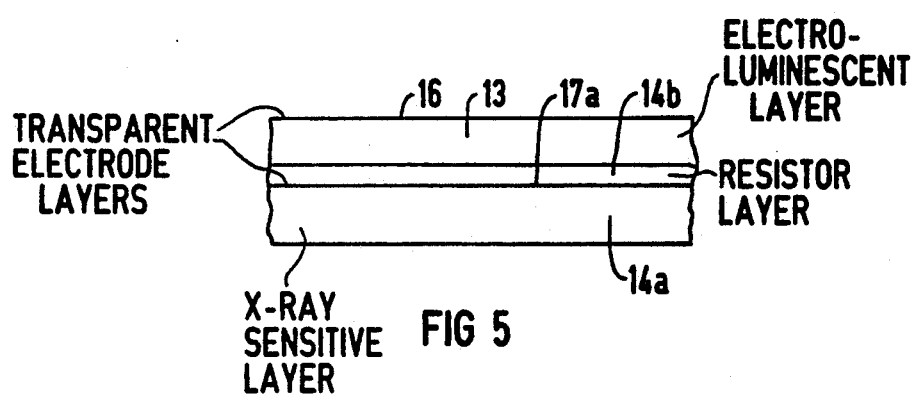
FIG. 5 is a side view of a portion of a further embodiment of a solid-state image transducer, suitable for use in any of the embodiments.

The solid-state image transducer 6 can be operated with a higher quantum efficiency by using a structure for the transducer 6 as shown in FIG. 5. In this embodiment, a luminescent, x-ray sensitive layer 14a, having a thickness of 100 μm through 300 μm is provided. The layer 14a may be vapor-deposited, in which case it may be a CsI:Na system, or may be a fine-grained polycrystalline material, such as a $Gd_2O_2S$:Tb system. The x-rays absorbed in the layer 14a are converted into visible light, with the emission maximum being at 420 nm for CsI:Na and at 545 nm for $Gd_2O_2S$:Tb.

The light drives the resistor layer 14b, which may consist of a thin (10 μm through 100 μm), vapor-deposited layer of $PbO_2$ or GaAs. The arrangement consisting of the layer 14a, a transparent electrode layer 17a and the resistor layer 14b for the solid-state image transducer has a high quantum efficiency with an improved topical sharpness. The quantum noise in the images can thus be further reduced using this arrangement.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostics installation for medical radiography comprising:

activatable means for generating an x-ray beam adapted to irradiate and penetrate a portion of an examination subject;

a multi-pixel solid-state image transducer having a resistor layer disposed so that x-rays which have penetrated said examination subject are incident thereon, the electrical resistance of said resistor layer being dependent on the intensity of the incident x-rays, and an electro-luminescent layer adjacent said resistor layer which converts the resistance of said resistor layer into a corresponding brightness value for each pixel, said electro-luminescent layer having a decay time during which said brightness value for each pixel is stored in said electro-luminescent layer;

optical scanning means for scanning said electro-luminescent layer after deactivation of said means for generating an x-ray beam and during said decay time and converting the brightness value for each pixel into an electrical signal; and means for processing said electrical signals and generating a visible image of said portion of said examination subject therefrom.

2. An x-ray diagnostics installation as claimed in claim 1 wherein said optical scanning means comprises a light detector for acquiring the brightness of individual pixels one at a time, and means for generating relative motion between said image transducer and said light detector for pixel-by-pixel image scanning of said image transducer.

3. An x-ray diagnostics installation as claimed in claim 1 wherein said optical scanning means comprises a linear light detector consisting of a row of detector elements for acquiring the brightness of the pixels of an image line of said image transducer, and means for generating relative motion between said image transducer and said light detector in a direction perpendicular to the linear extent of said linear light detector for line-by-line image scanning of said image transducer.

4. An x-ray diagnostics installation as claimed in claim 1 wherein said solid-state image transducer is planar.

5. An x-ray diagnostics installation as claimed in claim 1 further comprising means for gating said x-ray beam to produce a fan-shaped x-ray beam, wherein said solid-state image transducer is cylindrical, and further comprising a rotating drum on which said cylindrical image transducer is disposed for rotating said image transducer as said fan-shaped x-ray beam is incident thereon.

6. An x-ray diagnostics installation as claimed in claim 1 wherein said optical scanning means is a means for multiply reading out the image stored in said solid-state image transducer.

7. An x-ray diagnostics installation as claimed in claim 1 wherein said solid-state image transducer further has an x-ray sensitive layer disposed adjacent said resistor layer on a side thereof opposite said electro-luminescent layer.

* * * * *